United States Patent
Bendickson et al.

(10) Patent No.: US 10,775,175 B1
(45) Date of Patent: Sep. 15, 2020

(54) WEARABLE DEAD RECKONING SYSTEM FOR GPS-DENIED NAVIGATION

(71) Applicant: Rockwell Collins, Inc., Cedar Rapids, IA (US)

(72) Inventors: John G. Bendickson, Vinton, IA (US); William J. Croghan, Center Point, IA (US); Mitchell A. Riley, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 16/457,074

(22) Filed: Jun. 28, 2019

(51) Int. Cl.
*G01C 21/16* (2006.01)
*G01S 17/87* (2020.01)
*G01S 17/10* (2020.01)
*G06T 7/246* (2017.01)
*H04N 5/33* (2006.01)

(52) U.S. Cl.
CPC ............ *G01C 21/165* (2013.01); *G01S 17/10* (2013.01); *G01S 17/87* (2013.01); *G06T 7/248* (2017.01); *H04N 5/33* (2013.01); *G06T 2207/10028* (2013.01); *G06T 2207/10048* (2013.01); *G06T 2207/30244* (2013.01)

(58) Field of Classification Search
CPC ...... G01C 21/165; G01C 21/206; G06T 7/20; G06T 2207/10048; G01S 17/10; G01S 17/87; G01S 17/48
See application file for complete search history.

(56) References Cited

U.S. PATENT DOCUMENTS

| | | | | |
|---|---|---|---|---|
| 8,072,581 B1* | 12/2011 | Breiholz | ................... | G01S 7/51 356/5.01 |
| 8,682,504 B2* | 3/2014 | Vos | ........................ | G01C 11/02 701/3 |
| 8,823,551 B1* | 9/2014 | Hoffman | ............... | B60L 53/305 340/932.2 |
| 10,191,156 B2* | 1/2019 | Steinberg | ................ | G01S 17/42 |
| 2005/0182518 A1* | 8/2005 | Karlsson | .............. | G06K 9/6296 700/253 |
| 2005/0234679 A1* | 10/2005 | Karlsson | .............. | G05D 1/0248 702/181 |
| 2006/0049985 A1* | 3/2006 | Riel | ......................... | G01S 5/16 342/432 |

(Continued)

FOREIGN PATENT DOCUMENTS

WO WO-2017042672 A1 * 3/2017 ............. G01C 21/30

*Primary Examiner* — Masum Billah
*Assistant Examiner* — Michael Robert Cammarata
(74) *Attorney, Agent, or Firm* — Suiter Swantz pc llo

(57) ABSTRACT

A dead reckoning system for dismounted users is disclosed. The system uses a laser emitter to heat fixed points near the user. The points are ranged via LIDAR and imaged via thermal or IR imagers co-aligned with the laser emitter and LIDAR assembly (e.g., as a wearable personal system or a vehicle-based system). The system includes inertial sensors (e.g., accelerometers, gyrometers) to monitor attitude and motion trends of the system. Thermal images incorporating the heated points are captured at new user positions. The dead reckoning system includes a microcontroller for tracking distance and directional changes from one user position to the next by analyzing successive thermal images to determine changes in the position of the fixed heated points relative to the user.

15 Claims, 6 Drawing Sheets

(56) References Cited

U.S. PATENT DOCUMENTS

| | | | | |
|---|---|---|---|---|
| 2013/0332064 A1* | 12/2013 | Funk | ............... | G01C 21/00 |
| | | | | 701/409 |
| 2014/0379256 A1* | 12/2014 | Stipes | ............... | G01C 21/32 |
| | | | | 701/501 |
| 2015/0119086 A1* | 4/2015 | Mirowski | ............... | G01C 21/206 |
| | | | | 455/456.6 |
| 2019/0271779 A1* | 9/2019 | Margaritova | ............... | G01S 5/10 |
| 2019/0353784 A1* | 11/2019 | Toledano | ............... | G01S 17/86 |

* cited by examiner

WEARABLE DEAD RECKONING SYSTEM FOR GPS-DENIED NAVIGATION

BACKGROUND

Personal navigation systems for dismounted individuals (e.g., soldiers or firefighters away from their vehicles and vehicle-based navigational systems) can provide accurate satellite-based (e.g., GPS, GNSS) absolute position information in low-visibility areas (e.g., due to the presence of dust or fog) but may fail in remote areas where satellite-based positioning signals are obstructed or otherwise unavailable. Personal dead-reckoning systems may compensate for this by trying to determine, via pedometer counts or inertial measurement units (e.g., magnetic compasses, accelerometers, gyrometers), a current position relative to some absolute position. However, drift errors associated with inertial measurement units accumulate quickly, limiting the usable time of such systems to no more than 20 or 30 minutes. Longer-term accuracy may be achieved by the use of more sophisticated inertial measurement units (e.g., laser ring gyros), but such systems tend to be power-hungry, and too bulky for practical personal use.

SUMMARY

A dead reckoning system is disclosed. In embodiments, the dead reckoning system includes a light detection and ranging (LIDAR) assembly co-aligned with a laser emitter and one or more thermal or infrared (IR) imagers. The laser emitter thermally activates one or more selected points near a dismounted user at an initial location. The selected and thermally activated (e.g., heated) points are ranged by the LIDAR assembly (e.g., for elevation and range). The thermal imagers capture images of the heated points from the perspective of the initial location. The dead reckoning system includes inertial sensors, e.g., accelerometers and gyrometers, for determining an attitude or motion trend of the system, which may be wearable by the user or mounted to a mobile platform or vehicle piloted by the user. When the user moves to a subsequent location, the thermal imagers again capture images depicting the heated spots from the subsequent location and the inertial sensors again determine a current attitude of the system. The dead reckoning system includes a microcontroller for analyzing the attitude data and thermal images to determine the changes in position of the heated points with respect to each captured image, and thereby determine a motion (e.g., distance and direction) of the user from the initial location to the subsequent location, enabling the user to track his or her relative location in GPS-denied or low-visibility areas.

A method for dead reckoning is also disclosed. In embodiments, the method includes thermally activating, or temporarily heating, at least one point (e.g., location) via a laser emitter worn by a user or mounted to a mobile platform piloted by the user, the user occupying an initial position. The method includes ranging the heated points (e.g., for range and elevation) via a LIDAR assembly co-aligned with the laser emitter. The method includes capturing, from the initial position, thermal imagery of the heated points via a thermal imager or infrared camera co-aligned with the laser emitter and the LIDAR assembly. The method includes determining an attitude of the system (e.g., of the user, of the platform) from the initial position and corresponding to the first thermal image via inertial sensors worn by the user (or mounted to the platform). The method includes moving the user from the initial position to a subsequent position. The method includes capturing subsequent thermal images from the subsequent position via the thermal imager. The method includes determining a subsequent attitude of the platform (and corresponding to the subsequent images) from the subsequent position via the inertial sensors. The method includes comparing the initial and subsequent images (including the initial and subsequent attitudes) to determine changes in position of the heated points relative to the captured images and thereby determining a motion (e.g., distance, direction) of the system (e.g., of the platform, of the user) from the initial position to the subsequent position.

This summary is provided solely as an introduction to subject matter that is fully described in the Detailed Description and Drawings. The summary should not be considered to describe essential features nor be used to determine the scope of the Claims. Moreover, it is to be understood that both the foregoing summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
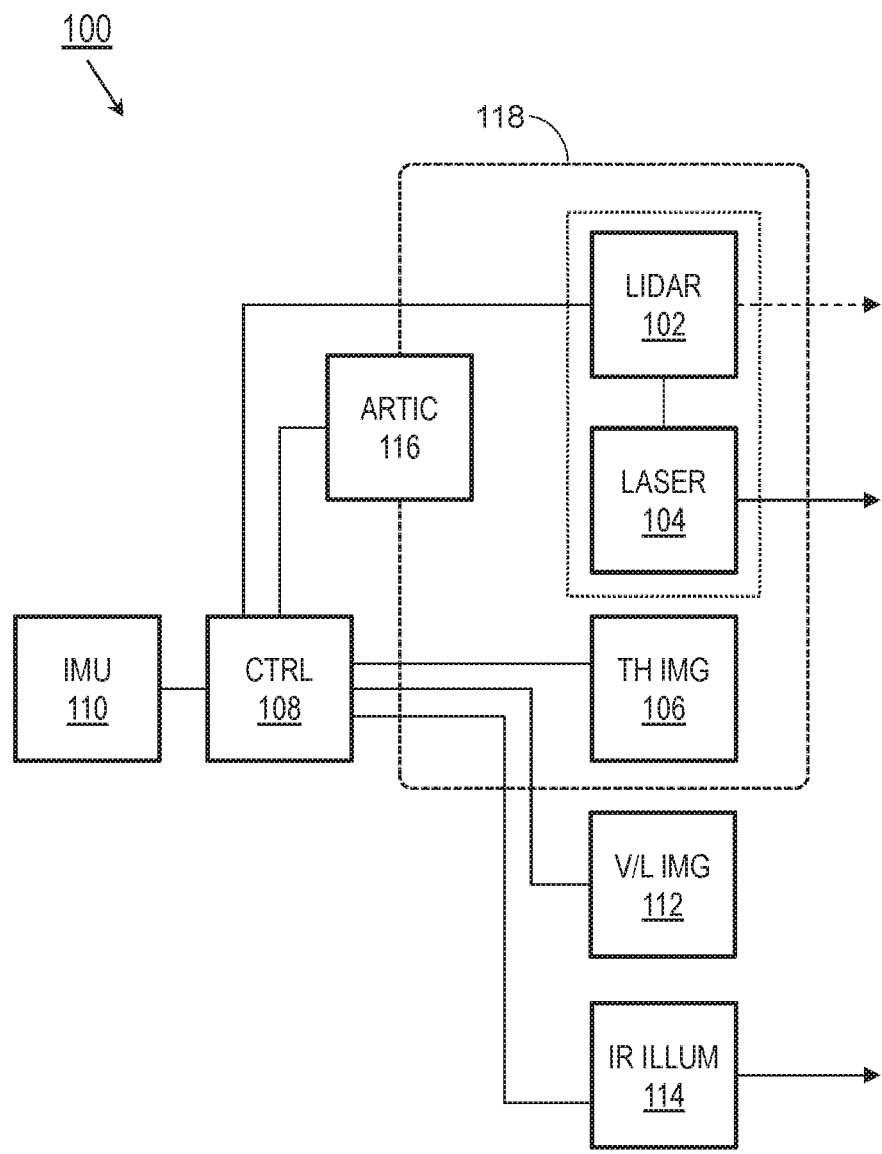
FIG. 1 is a block diagram illustrating a system for dead reckoning in a GPS-denied environment in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a compact and portable dead reckoning system wearable by a user and usable for longer periods of time than is possible with IMU-based systems susceptible to cumulative drift over time. The system may be wearable or vehicle-based, its range limited only by the sensitivity of its components. For example, a wearable system may be used to keep a dismounted user on a vector (e.g., corresponding to a compass direction) in extreme low-visibility environments despite the presence of physical obstacles, while an aircraft-based system may be able to track its position via waypoints several miles away, e.g., via sufficiently powerful lasers and sufficiently sensitive thermal imagers. Further, the dead reckoning system operates by thermally activating or heating points that decay, either naturally or after a predetermined period, such that the user may thereby track their own position but remain undetectable by hostile forces.

Referring to FIG. 1, a system 100 for dead reckoning is disclosed. In embodiments, the dead reckoning system 100 may include a light detection and ranging (LIDAR) assembly 102, a laser emitter 104, a thermal or infrared (IR) camera or imager 106, a microcontroller 108, and one or more inertial measurement units 110 (IMU).

In embodiments, the LIDAR assembly 102, laser emitter 104, and IR imager 106 may be co-located and co-aligned, e.g., worn on the head or shoulder of the dismounted user. While the LIDAR assembly 102 is not strictly required, its inclusion may significantly improve the accuracy of the system on uneven terrain, e.g., by determining a range and elevation to selected points. In some embodiments, the dead reckoning system 100 may include a LIDAR assembly incorporating the laser emitter 104, the single emitter capable of pulsed emissions (as a component of the LIDAR assembly 102) and continuous emissions (for thermal activation of terrain, as disclosed in detail below).

The microcontroller 108 may include one or more processors for controlling and coordinating the selection and activation of spots (e.g., points), the thermal activation (e.g., heating) of selected points by the laser emitter 104, the capture of images by the thermal imager 106, and the analysis of captured images to determine the motion of the user relative to heated points. The IMU 110 may include, for example, a triple-axis accelerometer and gyroscope to monitor the attitude and motion trend of the dead reckoning system 100 (e.g., relative to the environmental or earth frame; generally speaking, the position of the dead reckoning system 100 is substantially equivalent to the position of the user).

In some embodiments, the dead reckoning system 100 may include a visible light camera 112 or infrared (IR) illuminator 114 to improve the selection of waypoints for thermal activation. In some embodiments, the dead reckoning system 100 may include articulators (116) (e.g., actuators, gimbals, motors) capable of articulating the LIDAR assembly 102, the laser emitter 104, and the thermal imager 106 as a unified subsystem 118, e.g., for optimal selection of activation points and waypoints or for improved tracking and reheating of activated points. For example, the articulators 116 may steer the LIDAR/laser/imager subsystem 118 relative to the user along a linear axis (vertical or horizontal) or rotational axis (e.g., relative to the user's z-axis). The articulated/steered subsystem 118 may additionally include the visible-light camera 112 and/or IR illuminator 114. In some embodiments, the dead reckoning system 100 may incorporate a single LIDAR/laser/imager subsystem 118 worn by a user and capable of articulation relative to the user throughout a complete 360-degree field of view (e.g., relative to the user's z-axis).

Figure 2A:
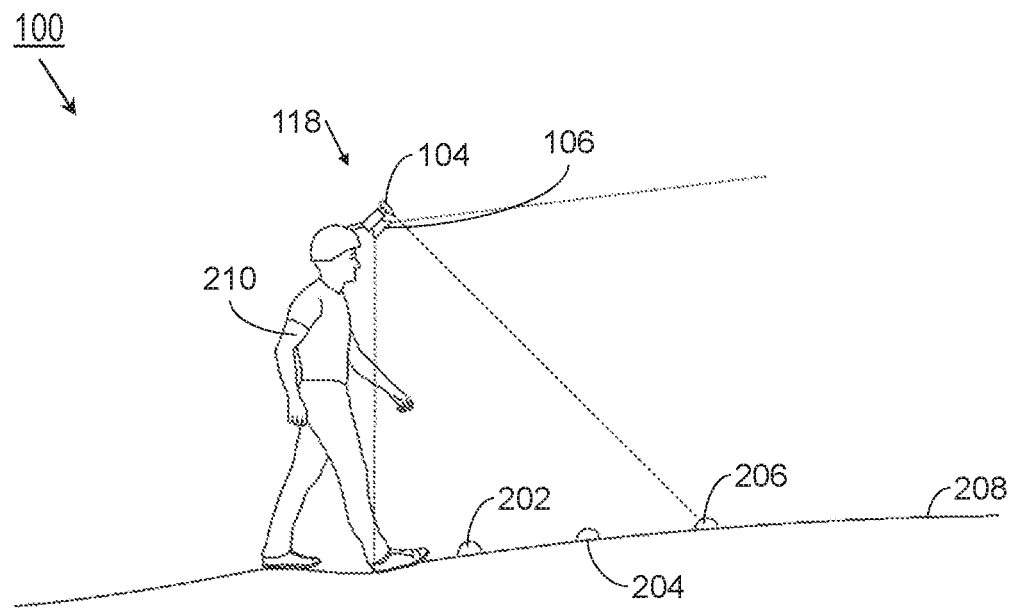
FIGS. 2A and 2B are respectively profile and overhead views illustrating the system of FIG. 1.
Figure 2B:
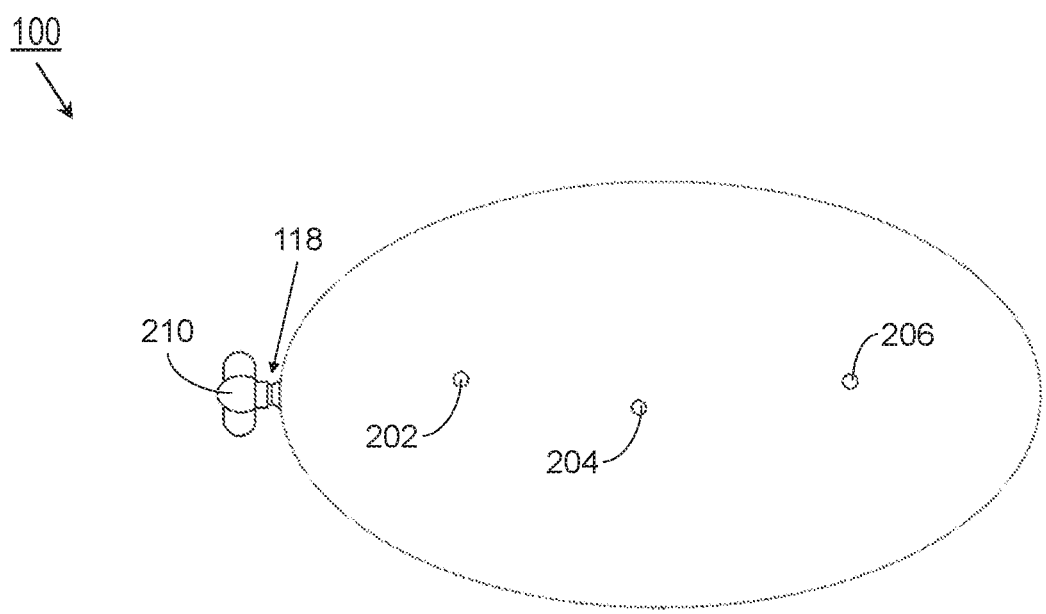

Referring now to FIGS. 2A and 2B, the dead reckoning system 100 is disclosed. In embodiments, the dead reckoning system 100 may employ the laser emitter 104 to thermally activate, e.g., temporarily heat, selected points (202, 204, 206) on the ground 208 proximate to the user 210. The selected points 202, 204, 206 may be heated to sufficient persistence that the points may be ranged by the LIDAR assembly (102, FIG. 1); e.g., to determine a current range and elevation to the user 210, and captured by the thermal imager 106 as the user 210 moves along the ground 208. In embodiments, the dead reckoning system 100 may be a compact and portable system worn by the user 210, e.g., a head-worn or helmet-mounted device, a shoulder-mounted device, a chest-mounted device, or any appropriate combination thereof.

Figure 3A:
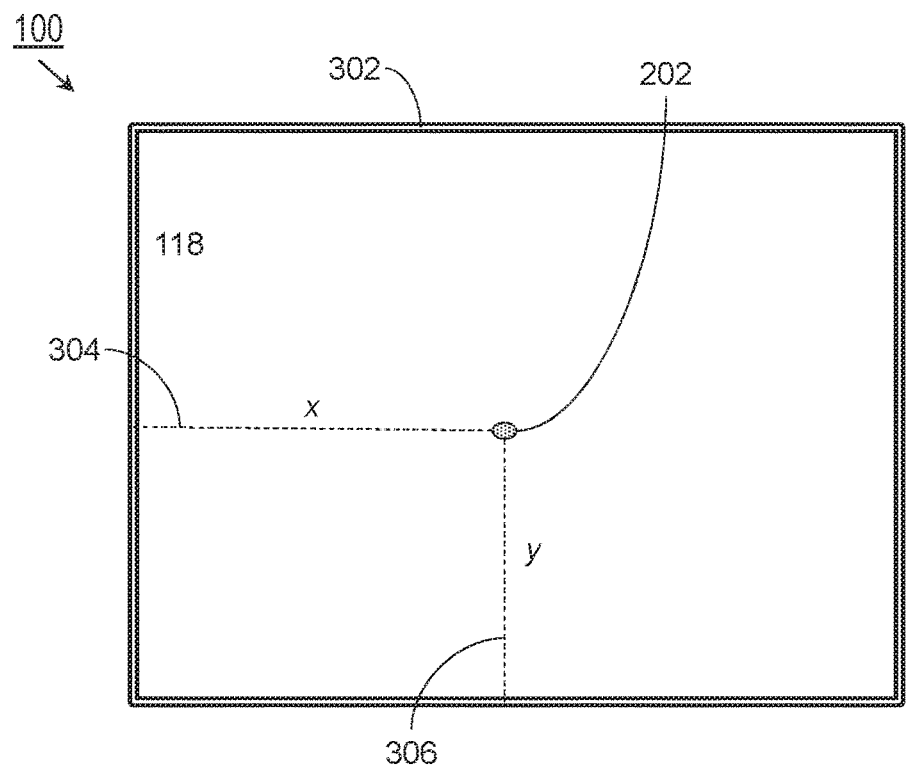
FIGS. 3A and 3B are diagrammatic illustrations of operations of the system of FIG. 1.
Figure 3B:
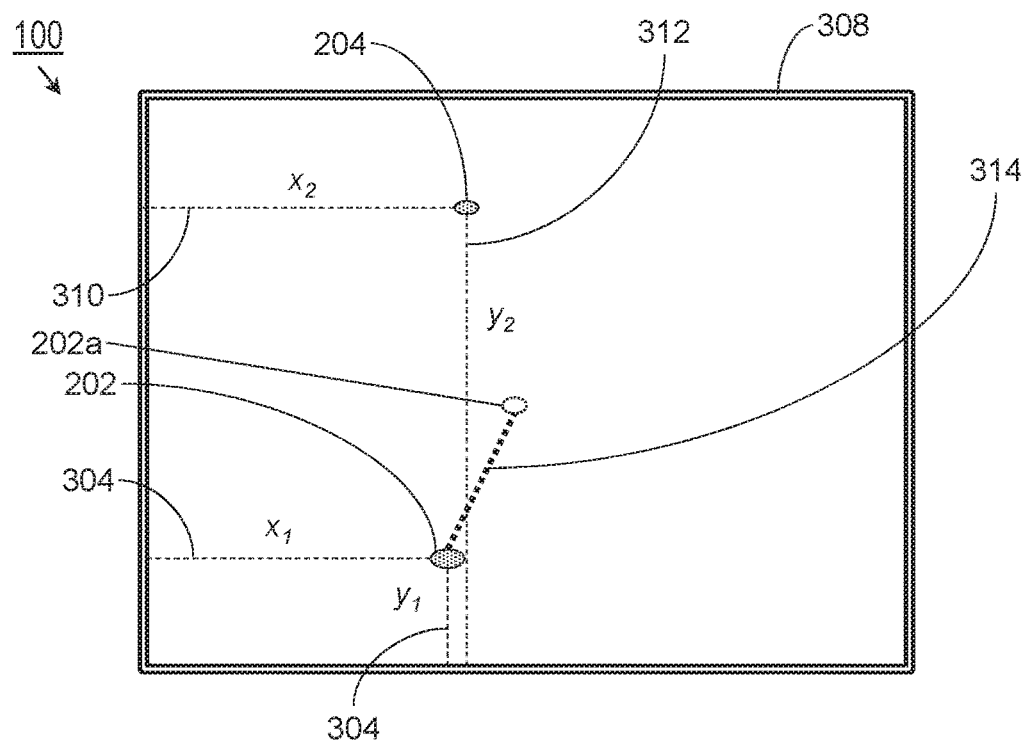

Referring now to FIGS. 3A and 3B, the dead reckoning system 100 is disclosed. Referring in particular to FIG. 3A, an image 302 may be captured by the thermal imager (106, FIG. 1) at an initial position of the user (210, FIG. 2A). For example, the image 302 may show a point 202 thermally activated by the dead reckoning system 100 from the initial position. The microcontroller (108, FIG. 1) may analyze the captured image 302, as well as the current attitude of the dead reckoning system 100 as determined by the IMUs 110 and the range and elevation of the point as determined by the LIDAR assembly (102, FIG. 1), to determine a position of the point 202 relative to the frame of the image 302 (e.g., an x-axis (304) and y-axis (306) position of the pixels representing the point relative to the image frame.

Referring now to FIG. 3B, the image 308 may be captured by the thermal imager 106 at a subsequent position of the user 210. For example, the image 308 may show the point 202 as well as the subsequent point 204 thermally activated by the dead reckoning system 100. From this subsequent position, the dead reckoning system 100 may re-range the points 202, 204 and determine the current attitude/motion trend of the system (e.g., relative to a pitch/x-axis or a roll/y-axis). The microcontroller 108 may analyze the image 308 to determine the current positions of the points 202, 204 relative to the frame of the image (e.g., pixel information, or the current size, shape, and/or x/y position of the point 202 (304, 306; $x_1$, $y_1$) and the point 204 (310, 312; $x_2$, $y_2$) relative to the frame) and the distance and direction (314) from the initial position (202a) of the point 202 to its current position relative to the image 308. Based on this pixel information, as well as changes in 1) the range and elevation of the points 202, 204 and 2) the attitude and motion trend of the dead reckoning system 100 from the initial position of the image 302 to the subsequent position of the image 308, the microcontroller 108 may determine the motion (e.g., a distance and a direction) of the user 210 from the initial position to the subsequent position. As the user proceeds along the terrain (208, FIG. 2A), the dead reckoning system 100 may range and thermally activate additional points, continuing to track the user's motion relative to the points 202, 204, 206 (FIG. 2A), which remain fixed. In some embodiments, the points 202, 204, 206 may be heated enough to decay within a predetermined period of time (e.g., 30 sec). Compared to more permanent terrain marking systems (e.g., involving paint, chalk, ribbons, or other tangible objects as fixed markers), the dead reckoning system 100 may provide for the eventual decay of the thermally activated points 202, 204, 206, such that the user 210 may thereby track his/her own relative position but, e.g., remain untrackable by enemy forces not immediately proximate, even if said forces are equipped with thermal imaging equipment.

Figure 4A:
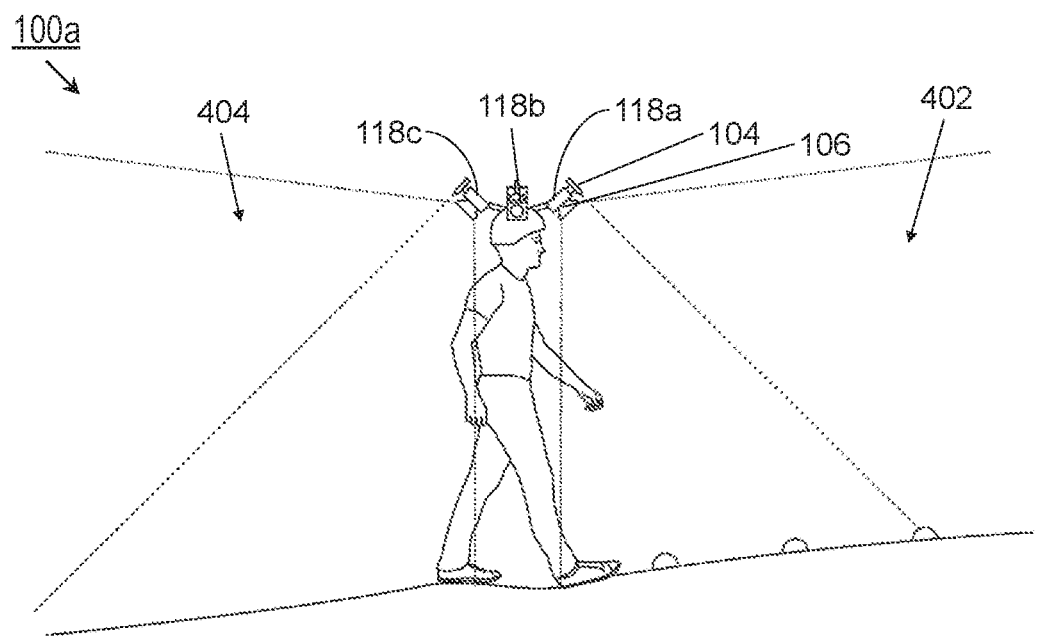
FIG. 4A is a profile view illustrating a fully optioned embodiment of the system of FIG. 1.
Figure 4B:
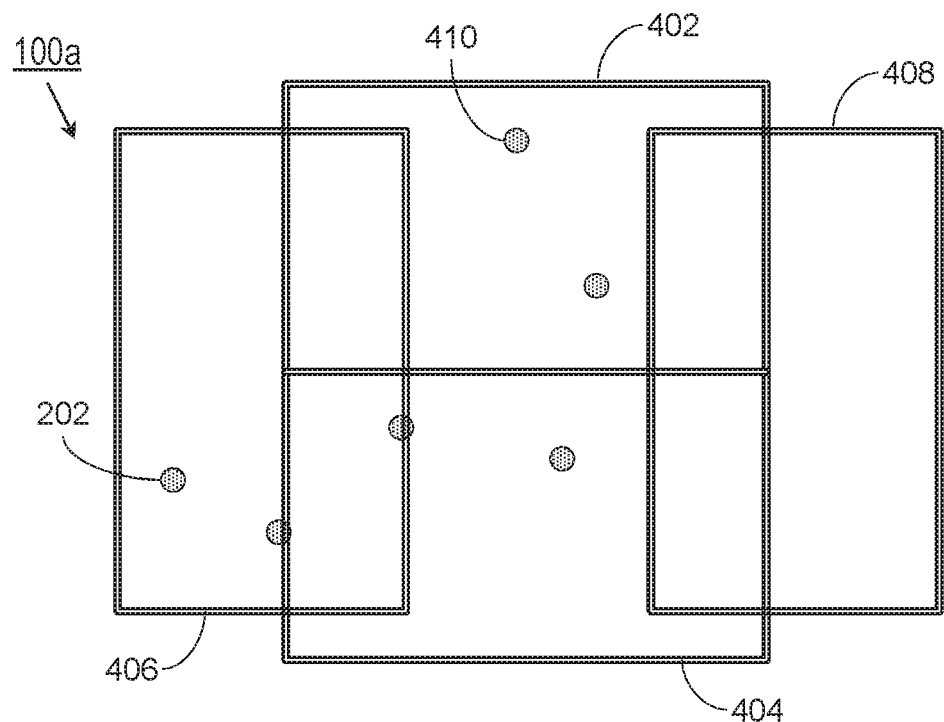
FIG. 4B is a profile view illustrating a vehicle-based embodiment of the system of FIG. 4A.

Referring now to FIGS. 4A and 4B, a dead reckoning system 100a is disclosed. The dead reckoning system 100a may be implemented and may function similarly to the dead reckoning system 100 of FIGS. 1 through 3B, except that the dead reckoning system 100a may incorporate multiple LIDAR/laser/imager subsystems 118a-c, each subsystem incorporating a co-aligned LIDAR assembly (102, FIG. 1), laser emitter 104, and thermal imager 106, and dedicated to a particular field of view (402, 404) relative to the user 210. For example, the subsystems 118a-c may be mounted in fixed positions relative to the user 210 and focused on fields of view in front of (402), to the left of, to the right of, and behind (404) the user. In embodiments, the dead reckoning system 100a may incorporate the multiple subsystems 118a-c to track the motion of the user 210 relative to points (202, 204, 206) behind, as well as ahead of, the user. For example, the subsystems 118a-c may be used to thermally activate points in multiple directions from the user 210, re-range previously ranged points from new positions, or reheat points previously thermally activated and subsequently passed by the user.

For example, the subsystems 118a-c may capture (via their respective thermal imagers 106) multiple images 402, 404, 406, 408 (e.g., fields of view) representing multiple fields of view from a particular position, which fields of view (and the corresponding images) may partially overlap. The microcontroller (108, FIG. 1) may compose multiple images 402, 404, 406, 408 and their corresponding multiple fields of view into a single composite image representing the position from which the images were captured, tracking the motion of the user through a longer sequence of points or re-ranging previously assessed points from new user positions. For example, the initial point 202, positioned in front of the user 210 when first heated, ranged and imaged, may be tracked as the user changes direction toward a most recently heated and ranged point 410 and the initial point is in the field of view of the left-facing subsystem (e.g., capturing the image 406).

Figure 4C:
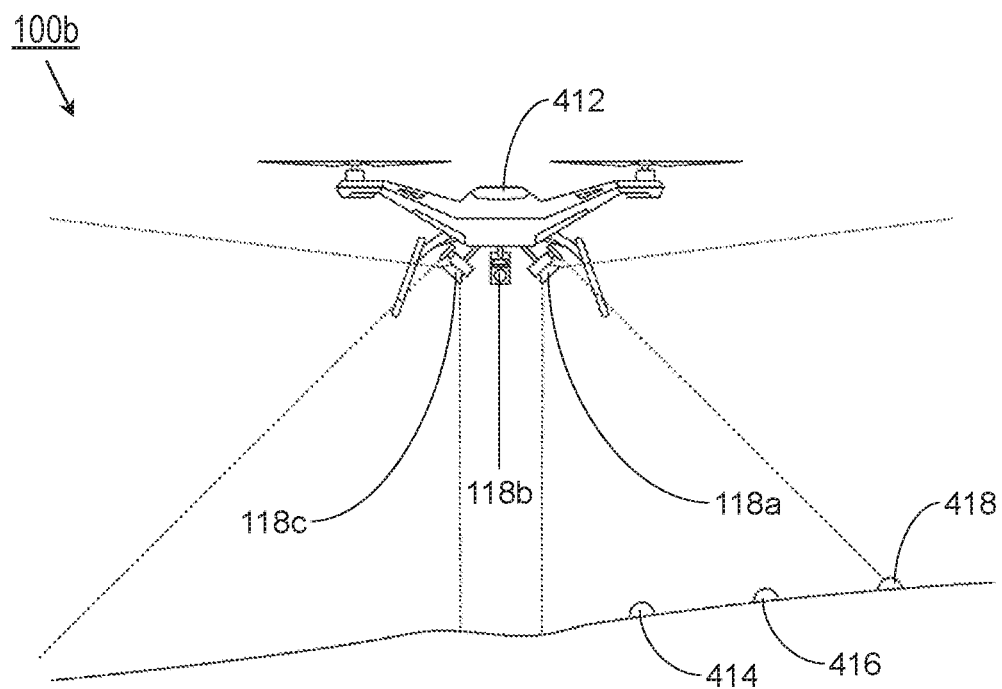
FIGS. 4C and 4D are diagrammatic illustrations of operations of the system of FIG. 4A.

Referring now to FIG. 4C, a dead reckoning system 100b is disclosed. The dead reckoning system 100b may be implemented and may function similarly to the systems 100 and 100a of FIGS. 1 through 4A, except that the dead reckoning system 100b may be mounted to a mobile platform, e.g., a ground-based or airborne vehicle (e.g., an unmanned aerial vehicle (UAV) 412). For example, the UAV 412 (or its remote operator) may track its position through GPS-denied areas (or, for example, if the UAV does not carry an onboard satellite-based navigation or positioning system) by thermally activating a series of points 414, 416, 418, and capturing images of the heated points via vehicle-mounted subsystems 118a-c. In some embodiments, the dead reckoning system 100b may be implemented aboard an aquatic, littoral, or other water-based vehicle. For example, the dead reckoning system 100b may be configured for use in caves or wetland environments where underwater objects, or objects and terrain fixed in a body of water, may be thermally activated.

Figure 4D:
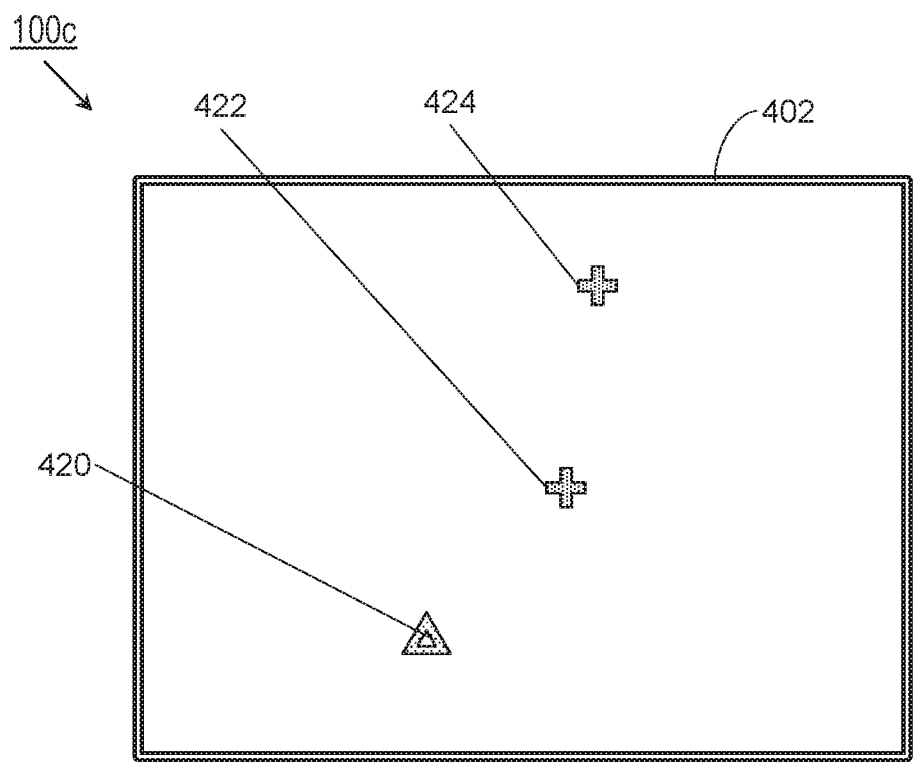

Referring now to FIG. 4D, the dead reckoning system 100c is disclosed. The dead reckoning system 100d may be implemented and may function similarly to the systems 100, 100a-b of FIGS. 1 through 4C, except that the articulation system (116, FIG. 1) of one or more LIDAR/laser/imager subsystems (118, FIG. 1) may be configured for fast and precise enough articulation to control the shape of the thermally activated points 420, 422, 424, e.g., to assist the user (210, FIG. 4A) if he or she should become disoriented and lose their way. For example, the dead reckoning system 100c may thermally activate, and the captured thermal image corresponding to the forward field of view 402 may show, an initial point 420 in the shape of a triangle, and subsequent points 422, 424 in the shape of a cross, so that the initial point may be more clearly distinguished from other points.

Figure 5:
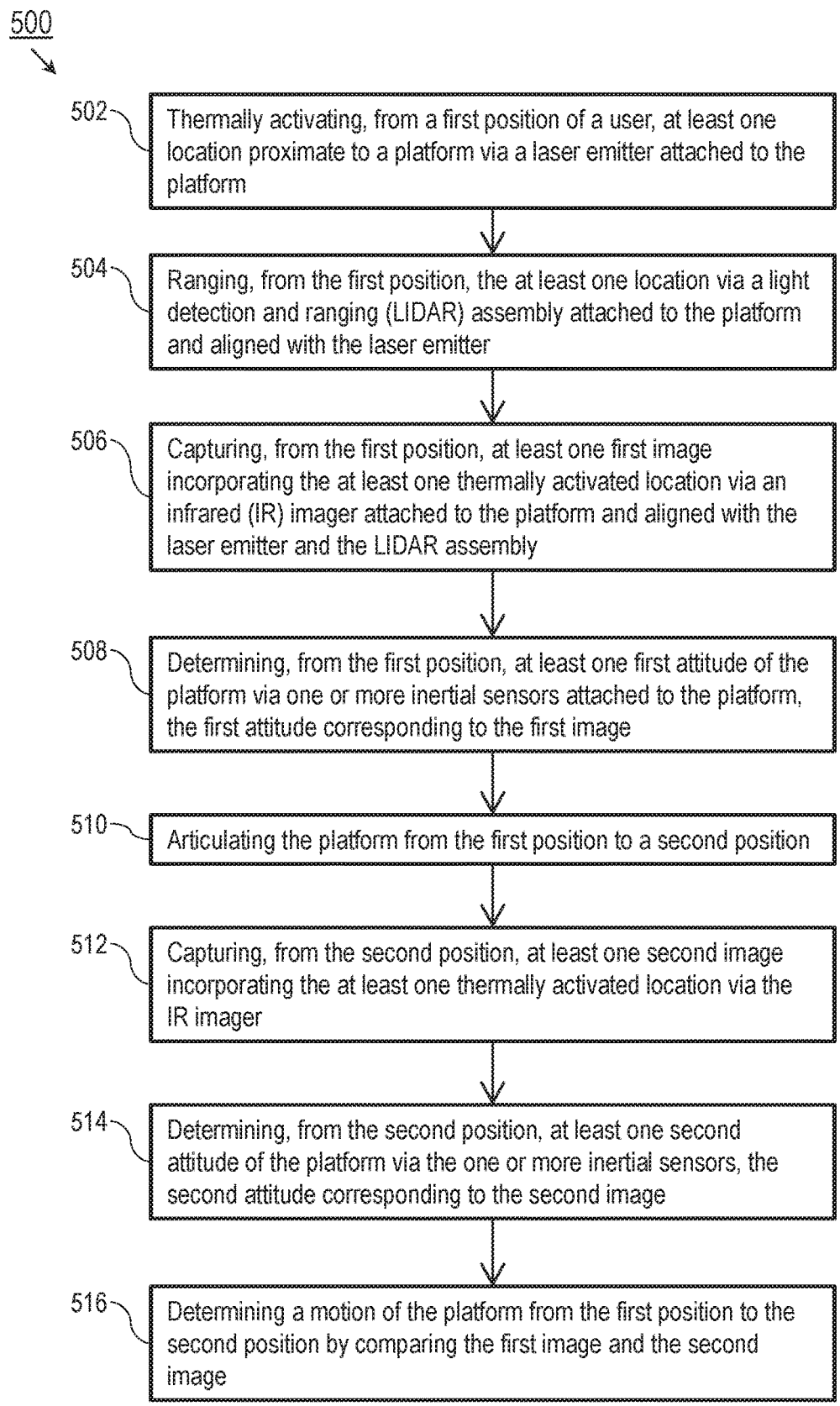
FIG. 5 is a process flow diagram illustrating a method for dead reckoning in accordance with example embodiments of this disclosure.

Referring now to FIG. 5, an exemplary embodiment of a method 500 for dead reckoning according to the inventive concepts disclosed herein may be implemented by the dead reckoning systems 100, 100a-c of FIGS. 1 through 4D in some embodiments, and may include one or more of the following steps.

At a step 502, the dead reckoning system thermally activates (e.g., via a laser emitter) at least one proximate point near the initial position of the user.

At a step 504, the system ranges (e.g., via a LIDAR assembly co-aligned with the laser emitter) the thermally activated points from the initial position.

At a step 506, the system captures (e.g., via a thermal or infrared imager co-aligned with the laser emitter and the LIDAR assembly) one or more images incorporating the thermally activated points from the initial position.

At a step 508, the system determined (e.g., via onboard IMUs) an attitude of the platform (e.g., of the system, relative to the user) at the initial position and corresponding to the image/s captured at that position.

At a step 510, the user moves the platform (and the system) from the initial position to a subsequent position.

At a step 512, the system captures, from the subsequent position, additional images incorporating the thermally activated points (e.g., via the thermal imager).

At a step 514, the system determines, from the subsequent position, a second attitude of the platform (e.g., via the IMUs), the second attitude corresponding to the additional images.

At a step 516, the system determines a motion of the system (e.g., of the platform, of the user) between the initial position and the subsequent position by comparing the initial images and the subsequent images. For example, the microcontroller may analyze pixel information of the images to determine the positions of the thermally activated points relative to the frame at the initial and subsequent positions, and analyze the changes in attitude between the initial and subsequent positions. The determined motion of the system may include a distance and a direction of motion, e.g., from the initial to the subsequent position.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A dead reckoning system, comprising:
    at least one light detection and ranging (LIDAR) assembly mounted to a platform and configured to range one or more locations proximate to an operator of the platform;
    at least one laser emitter mounted to the platform and aligned with the LIDAR assembly, the laser emitter configured to thermally activate the one or more locations;
    one or more inertial sensors coupled to the platform, the inertial sensors configured to determine an attitude of the platform;
    at least one infrared (IR) imager mounted to the platform and aligned with the LIDAR assembly and the laser emitter, the IR imager configured to capture at least:
        1) a first image of the one or more thermally activated locations, the first image corresponding to a first position of the platform and a first attitude of the platform; and
        2) a second image of the one or more thermally activated locations, the second image corresponding to a second position of the platform and a second attitude of the platform;
    and
    at least one microcontroller communicatively coupled to the LIDAR assembly, the laser emitter, the IR imager, and the inertial sensors, the microcontroller including at least one processor and configured to:
        1) compare the first image and the second image; and
        2) determine a motion of the platform from the first position to the second position based on the comparison.

2. The dead reckoning system of claim 1, wherein the motion of the platform includes at least one of 1) a distance between the first position and the second position and 2) a direction between the first position and the second position.

3. The dead reckoning system of claim 1, wherein comparing the first image and the second image includes at least one of:
    comparing first pixel information of the first image to second pixel information of the second image;
    and
    comparing the first attitude and the second attitude.

4. The dead reckoning system of claim 1, wherein the one or more inertial sensors include at least one of an accelerometer, a gyrometer, a compass, a six-degrees-of-freedom (6DOF) inertial sensor, and a nine-degrees-of-freedom (9DOF) sensor.

5. The dead reckoning system of claim 1, wherein the LIDAR assembly, the laser emitter, and the IR imager comprise a first subsystem aligned with at least one first field of view (FOV), further comprising:
    at least one second subsystem mounted to the platform and aligned with at least one second FOV, the second subsystem comprising:
        at least one second LIDAR assembly configured to range the one or more locations;
        at least one second laser emitter configured to thermally activate the one or more locations;
        and
        at least one second IR imager configured to capture at least the first image and the second image.

6. The dead reckoning system of claim 1, wherein the LIDAR assembly and the laser emitter comprise a coaxial system in which the laser emitter is configured:
    for pulse emission as a component of the LIDAR assembly;
    and
    for continuous emission as a thermal activator of the one or more locations.

7. The dead reckoning system of claim 1, wherein the LIDAR assembly, the laser emitter, and the IR imager are articulable relative to the operator.

8. The dead reckoning system of claim 7, wherein the LIDAR assembly, the laser emitter, and the IR imager are articulable along at least one of a linear axis and a rotational axis relative to the operator.

9. The dead reckoning system of claim 8, wherein the LIDAR assembly, the laser emitter, and IR imager are articulable through a full 360 degrees relative to the rotational axis.

10. The dead reckoning system of claim 7, further comprising:
    at least one memory in communication with the microcontroller, the memory capable of storing at least one pattern;
    wherein the microcontroller is programmed to direct the laser emitter to thermally activate the one or more locations according to the at least one pattern.

11. The dead reckoning system of claim 1, wherein the platform is a portable platform wearable by the operator.

12. The dead reckoning system of claim 1, wherein the platform is a mobile platform including at least one of an airborne vehicle, a ground-based vehicle, and an aquatic vehicle.

13. A method for dead reckoning, the method comprising:

thermally activating, from a first position of a user, at least one location proximate to a platform via a laser emitter attached to the platform;

ranging, from the first position, the at least one location via a light detection and ranging (LIDAR) assembly attached to the platform and aligned with the laser emitter;

capturing, from the first position, at least one first image incorporating the at least one thermally activated location via an infrared (IR) imager attached to the platform and aligned with the laser emitter and the LIDAR assembly;

determining, from the first position, at least one first attitude of the platform via one or more inertial sensors attached to the platform, the first attitude corresponding to the first image;

articulating the platform from the first position to a second position;

capturing, from the second position, at least one second image incorporating the at least one thermally activated location via the IR imager;

determining, from the second position, at least one second attitude of the platform via the one or more inertial sensors, the second attitude corresponding to the second image;

and determining a motion of the platform from the first position to the second position by comparing the first image and the second image.

14. The method of claim 13, wherein determining a motion of the platform from the first position to the second position by comparing the first image and the second image includes:

determining at least one of 1) a distance between the first position and the second position and 2) a direction between the first position and the second position by comparing the first image and the second image.

15. The method of claim 13, wherein determining a motion of the platform from the first position to the second position by comparing the first image and the second image includes:

determining a motion of the platform by comparing at least one of:

1) first pixel information of the first image and second pixel information of the second image;

and 2) the first attitude and the second attitude.

* * * * *